US 12,107,894 B1

(12) United States Patent
Acosta et al.

(10) Patent No.: US 12,107,894 B1
(45) Date of Patent: Oct. 1, 2024

(54) AUTOMATED SERVICE TICKET GENERATION

(71) Applicant: State Farm Mutual Automobile Insurance Company, Bloomington, IL (US)

(72) Inventors: Cesar Bryan Acosta, Atlanta, GA (US); Faith Alexis Brumfield, Johns Creek, GA (US); Sarah Gichuhi, Dacula, GA (US); Claire Roop, Canton, GA (US); Andrew Warner, Atlanta, GA (US); Amanda Yang, Snellville, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 453 days.

(21) Appl. No.: 17/326,151

(22) Filed: May 20, 2021

Related U.S. Application Data

(60) Provisional application No. 63/027,662, filed on May 20, 2020.

(51) Int. Cl.
*H04L 9/40* (2022.01)
*H04L 67/5682* (2022.01)

(52) U.S. Cl.
CPC .......... *H04L 63/20* (2013.01); *H04L 63/1425* (2013.01); *H04L 67/5682* (2022.05)

(58) Field of Classification Search
CPC .. H04L 63/20; H04L 63/1425; H04L 67/5682
See application file for complete search history.

(56) References Cited

U.S. PATENT DOCUMENTS

| 8,074,121 B2 | 12/2011 | Biazetti et al. |
| 8,161,326 B2 | 4/2012 | Dixit et al. |

(Continued)

FOREIGN PATENT DOCUMENTS

| JP | 2011018360 A | 1/2011 |
| KR | 20060058186 A | 5/2006 |

(Continued)

OTHER PUBLICATIONS

Esayas et al., "An Integrated Method for Compliance and Risk Assessment", Sep. 2015, IEEE Conference on Communications and Network Security, pp. 568-576 (Year: 2015).*

*Primary Examiner* — Kenneth W Chang
(74) *Attorney, Agent, or Firm* — Lee & Hayes, P.C.

(57) ABSTRACT

An automated service ticket generation system including an application configured to receive risk data associated with an asset and generate a service ticket based on the risk data. The application may receive risk data including an indication of whether the asset is out of compliance or will soon be out of compliance with a policy and/or regulation. Responsive to receiving the risk data, the application may access a remote computing device to generate the service ticket. The service ticket may include a mitigation task for an asset owner to perform in order to comply with the policy and/or regulation. The application may cause an indication of the service ticket to be presented on a display of a computing device. In some examples, the application may cause an indication of the service ticket to be sent to a computing device associated with the asset.

20 Claims, 9 Drawing Sheets

(56) References Cited

U.S. PATENT DOCUMENTS

| | | |
|---|---|---|
| 8,501,257 B2 | 8/2013 | Vinokur et al. |
| 8,756,698 B2 | 6/2014 | Sidagni |
| 8,826,403 B2 | 9/2014 | Bhaskaran et al. |
| 10,019,677 B2 | 7/2018 | Gill et al. |
| 10,282,426 B1 | 5/2019 | Lerner et al. |
| 2004/0103310 A1* | 5/2004 | Sobel .................... H04L 63/105 709/223 |
| 2005/0015622 A1* | 1/2005 | Williams ............ H04L 63/0227 726/4 |
| 2005/0044418 A1* | 2/2005 | Miliefsky ........... H04L 63/0272 726/4 |
| 2006/0191007 A1* | 8/2006 | Thielamay ............ G06F 21/577 726/22 |
| 2007/0288280 A1* | 12/2007 | Gilbert ................. G06F 21/554 705/80 |
| 2007/0288800 A1* | 12/2007 | Chavez, Jr. ......... G06F 11/0709 714/39 |
| 2008/0295100 A1 | 11/2008 | Ainsworth |
| 2010/0100778 A1 | 4/2010 | Sullivan |
| 2011/0126111 A1* | 5/2011 | Gill ....................... G06F 21/577 715/736 |
| 2013/0339457 A1* | 12/2013 | Freire ................ G06Q 10/0635 709/204 |
| 2015/0347751 A1 | 12/2015 | Card et al. |
| 2017/0034200 A1 | 2/2017 | Costin et al. |
| 2018/0018602 A1* | 1/2018 | DiMaggio ............. G16H 10/60 |
| 2018/0124091 A1* | 5/2018 | Sweeney ............... G06F 21/554 |
| 2018/0189797 A1 | 7/2018 | Ravi |
| 2019/0378073 A1 | 12/2019 | Lopez et al. |

FOREIGN PATENT DOCUMENTS

| | | |
|---|---|---|
| WO | WO2011044681 A1 | 4/2011 |
| WO | WO2016186662 A1 | 11/2016 |

\* cited by examiner

AUTOMATED SERVICE TICKET GENERATION

RELATED APPLICATIONS

This patent application is a continuation of and claims priority to U.S. Provisional Patent Application No. 63/027,662, filed May 20, 2020, and entitled "Automated Service Ticket Generation," the entirety of which is hereby incorporated by reference.

BACKGROUND

Information technology (IT) assets may be assessed for compliance with policies and regulations. Compliance may include periodic IT asset reviews, and the like, as defined by various policies and/or regulations. The policies and/or regulations may be internal to a company and/or externally driven, such as by federal law or regulation. To ensure that IT assets remain in compliance with policies and/or regulations, service tickets including mitigation tasks may be generated. The mitigation task may include a task to perform to ensure compliance with a policy and/or regulation. The service ticket may include an instruction to perform the mitigation task in order to bring the IT asset into compliance or to ensure the IT asset remains in compliance. Current systems include IT asset managers to manually generate the service tickets and, in some cases, send the service tickets to an IT asset user (e.g., user or owner responsible for the IT asset). However, the manual generation of service tickets can be extremely time consuming and labor intensive.

SUMMARY

In an example of the present disclosure, a system is configured to receive, from a first computing device via an information technology asset management (ITAM) application, risk data identifying an asset that: is out of compliance with a policy or a regulation or will be out of compliance with the policy or the regulation within a period of time. The system is further configured to receive an input associated with access to a second computing device. The system is yet further configured to generate, by the ITAM application and based at least in part on the input, a command to generate a service ticket associated with the asset, the command including at least a portion of the risk data. The system is still yet further configured to send the command to the second computing device and in based on the response, receive a first service ticket from the second computing device, the first service ticket including a unique identifier. The system may then cause, by the ITAM application, at least the unique identifier to be presented on the display.

In another example of the present disclosure, a method includes receiving, from a first computing device via a network, risk data identifying an asset that is at risk of being out of compliance with a policy or a regulation. The method further includes receiving an input associated with access to a second computing device and based at least in part on the input, generating, by an ITAM application, a command to generate a service ticket associated with the asset. The method yet further includes sending the command to the second computing. The method still yet further includes receiving a first service ticket associated with the asset and causing at least a unique identifier associated with the first service ticket to be presented on a display associated with the ITAM application.

In a further example of the present disclosure, a method includes a method includes receiving, from a first computing device via a network, risk data identifying an asset that is out of compliance with a policy or a regulation. The method further includes receiving an input associated with access to a second computing device and based at least in part on the input, generating, by an ITAM application, a command to generate a service ticket associated with the asset. The method yet further includes sending the command to the second computing. The method still yet further includes receiving a first service ticket associated with the asset and causing at least a unique identifier associated with the first service ticket to be presented on a display associated with the ITAM application.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to an automated service ticket generation system. The automated service ticket generation system may include an information technology asset management (ITAM) application configured to automatically generate service tickets associated with assets that are out of compliance or at risk of being out of compliance with a policy and/or regulation. The ITAM application receives, from one or more computing devices, risk data associated with one or more assets. The ITAM application also receives, via a user interface, an instruction to automatically generate a service ticket. Responsive to the instruction, the ITAM application may log into a remote service provider associated with service ticket generation, send relevant risk data to the remote service provider, and cause a service ticket to be generated. The ITAM application may cause the service ticket and/or an indication thereof to be presented on a display for viewing by an ITAM system manager, asset user, or the like, thereby providing a means by which a compliance risk can be mitigated.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
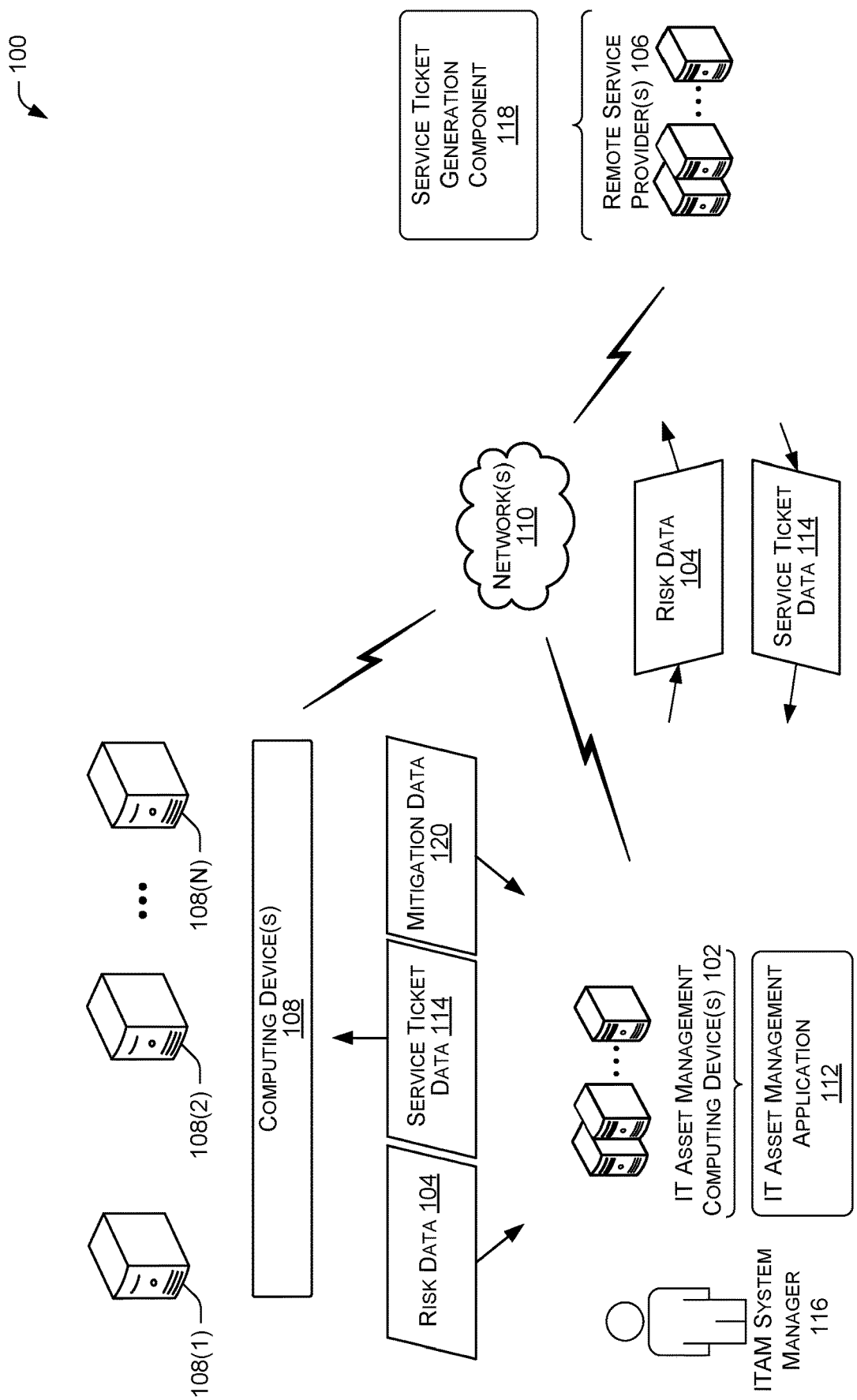
FIG. 1 illustrates an example automated service ticket generation system that includes an information technology asset management service provider to receive risk data and generate a service ticket based on the risk data, as described herein.

FIG. 1 illustrates an example automated service ticket generation system 100 (system 100) that includes one or more information technology asset management (ITAM) computing device(s) 102 configured to receive risk data 104 and generate a service ticket via a remote service provider 106 based on the risk data 104, as described herein. Risk data may include an asset identifier, an asset user (e.g., individual responsible for the asset), a type of asset (e.g., hardware, software, etc.), a reason associated with a compliance risk (e.g., out of compliance or at risk of being out of compliance), a deadline associated with compliance, and the like. In some examples, the application may be configured to generate a service ticket to document the compliance risk and provide a means by which the compliance risk may be mitigated.

The ITAM computing device(s) 102 (also referred to herein as ITAM computing devices 102, ITAM computing device 102) may provide IT asset management support services for one or more computing devices 108 of an organization, such as first computing device 108(1), second computing device 108(2), and an n$^{th}$ computing device 108(N). In some examples, the computing device(s) 108 may be associated a different organization from the ITAM computing device 102. In at least one example, the computing device(s) 108 may be associated with a same organization as the ITAM computing device(s) 102. In such examples, the ITAM computing device(s) 102 may have access to information associated with the computing device(s) 108 that may not otherwise be available. For example, the ITAM computing device(s) 102 may be configured to access settings, data storage information, and the like associated with the computing device(s) 108.

In various examples, the one or more ITAM computing device(s) 102 may be configured to communicate with one another a distributed computing resource. In some examples, the ITAM computing device(s) 102, the computing device(s) 108, and/or the remote service provider computing device(s) 106 may include a variety of device types configured to communicate via one or more networks 110 and are not limited to a particular type of device. In some examples, device types may include stationary devices, including but not limited to servers, desktop computers, personal computers, work stations, and thin clients, such as those capable of operating in the distributed computing resource. In some examples, the ITAM computing device(s) 102, the computing device(s) 108, and/or the remote service provider computing device(s) 106 may include mobile devices, including but not limited to mobile phones, tablet computers, laptop computers, and any other mobile computers or mobile telecommunication devices. In various examples, the ITAM computing device(s) 102, the computing device(s) 108, and/or the remote service provider computing device(s) 106 may include any other sort of computing device configured to communicate via the one or more networks 110.

In various examples, network(s) 110 may include public networks such as the internet, private networks such as an institutional and/or personal network or some combination of public and private networks. Network(s) 110 may also include any type of wired and/or wireless network, including but not limited to local area networks (LAN), wide area networks (WAN), satellite networks, cable networks, Wi-Fi networks, WiMax networks, mobile communications networks (e.g., 3G, 4G, etc.), or any combination thereof. Network(s) 110 may utilize communications protocols, including packet-based and/or datagram-based protocols, such as internet protocol (IP), transmission control protocol (TCP), user datagram protocol (UDP), or other types of protocols. Moreover, network(s) 110 may also include a number of devices that facilitate network communications and/or form a hardware basis for the networks, such as switches, routers, gateway access points, firewalls, base stations, repeaters, backbone devices, and the like.

In some examples, network(s) 110 may further include devices that can enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In various examples, the ITAM computing device(s) 102 may receive risk data 104 from the computing device(s) 108 via the network 110. In various examples, the computing device(s) 108 may generate a report to determine one or more assets that are at risk of being out of compliance or are out of compliance with one or more policies and/or regulations. As discussed above, the policies and/or regulations may include policies and/or regulations that are internal to an organization associated with the asset(s) (e.g., internal guidelines, operating procedures, etc.) and/or the computing device(s) 108 and/or are external to the organization (e.g., federal law; federal regulations, state law; state regulations, etc.).

In some examples, an asset may be at risk of being out of compliance based on a determination that a deadline for an action to comply with a policy and/or regulation is within a threshold time of a current time (e.g., time associated with generating the report). The threshold time may include a number of hours (e.g., 10 hours, 48 hours, etc.), a number of days (e.g., 30 days, 45 days, 60 days, etc.), a number of weeks (e.g., 1 week, 2 weeks, 3 weeks, etc.), a number of months (e.g., one month, two months, etc.), prior to the deadline. For example, a policy or regulation may require that all computing devices to have a virus scan run annually. A computing device 108, such as computing device 108(1) may generate a report and determine that a particular asset last had a virus scan 340 days ago and is within 25 days of being out of compliance with the policy. The computing device 108(1) may include the particular asset in the report as an asset that is at risk of being out of compliance.

In various examples, the report may include risk data 104. The risk data 104 may include an identifier associated with the asset (e.g., numbers, letters, symbols designated for the asset), an identifier associated with a user of the asset (e.g., an owner or individual otherwise responsible for the asset), an organizational department associated with the user and/or the asset, a type of asset (e.g., hardware, software, etc.), a policy and/or regulation associated with the compliance risk, a reason for the asset to be associated with the compliance risk, a timeline associated with the compliance risk (e.g., annual review due in 15 days, etc.), a date associated with the report and/or the risk data 104.

In various examples, the computing device(s) 108 may send the risk data 104 to the ITAM computing device(s) 102 for service ticket generation via an ITAM application 112. In some examples, the computing device(s) 108 may include an instance of the ITAM application 112. In such examples, the computing device(s) 108 may be configured to generate the risk data 104 and utilize the ITAM application 112 to automatically generate a service ticket 114 as will be discussed below.

In at least one example, the ITAM computing device(s) 102 may receive the risk data 104 from the one or more computing device(s) 108. In some examples, the risk data 104 may be sent via a tabular file (e.g., comma-separated value (.csv) file, an Excel (.xls) file, etc.), an electronic mail (email) message (e.g., in the text thereof, a hyperlink, an attachment (e.g., .pdf file, .docx file, etc.) and/or any other type of file capable of being read and/or having data parsed therefrom. In at least one example, risk data 104 associated with an asset that is at risk of being out of compliance may be sent via the tabular file and risk data 104 associated with an asset that is out of compliance may be sent via email. For example, a first computing device 108(1) may generate a report and determine that three assets associated with a user are at risk (e.g., within a threshold time) of being out of compliance. The first computing device 108(1) may send a .csv file to the ITAM computing device(s) 102 to generate service tickets related to the three assets associated with the user. A second computing device 108(2) may generate a report and determine that one asset associated with a user is out of compliance. The second computing device 108(2) may send an electronic mail message to the ITAM computing device(s) 102 to generate a service ticket associated with the asset that is out of compliance. The service ticket associated with the asset that is out of compliance may include a record of non-compliance.

The ITAM computing device(s) 102 may receive the risk data 104 and present a representation of the risk data 104, such as on a user interface associated therewith. The representation of the risk data 104 may include a file name, an email name, or other identifier associated with the file or email containing the risk data 104. For example, the ITAM computing device(s) 102 may receive a file with an identifier 20_02_QA13_HW.csv including risk data 104 associated with a hardware (HW) asset that is at risk of being out of compliance. Though this is merely an example, and other identifiers including different and/or additional information are contemplated herein. As will be discussed below with regard to FIGS. 3 and 5, the representation of the risk data 104 may be presented in a window associated with pending service tickets.

In some examples, responsive to the risk data 104 being presented on via the ITAM application 112, an ITAM system manager 116 may view the representation of the risk data 104 via the user interface. In some examples, the ITAM system manager 116 may determine a remote service provider 106 associated with the risk data 104. In at least one example, risk data 104 associated with a first asset that is at risk of being out of compliance may be associated with a first remote service provider 106 and a second asset that is out of compliance may be associated with a second remote service provider 106.

In at least one example, the remote service provider(s) 106 may provide one or more IT asset management services, such as monitoring risk associated with an organization, analytical analysis of organizational risk, knowledge management, risk management, and the like. For example, the remote service provider 106 may include Hewlett Packard Service Manager, RSA Archer® Suite, and the like. Though these are merely examples and are not intended to be limiting.

In various examples, the ITAM system manager 116 may provide an input via the ITAM application 112 associated with access to the determined remote service provider 106. The input may include a login alias and/or password associated with the remote service provider 106. In some examples, responsive to receiving the input, the ITAM application 112 may log in to a computing device associated with the remote service provider 106. In such examples, a communication path between the ITAM computing device(s) 102 and the remote service provider(s) 106 may be established.

In some examples, the ITAM system manager 116 may provide an instruction (or indication thereof) via the ITAM application 112 to automatically generate a service ticket associated with risk data 104. In some examples, responsive to receiving the instruction, the ITAM system manager 116 may access the computing device associated with remote service provider 106 (utilizing the access input) and may generate the service ticket via a service ticket generation component 118 of the remote service provider 106.

In some examples, responsive to receiving the instruction, the ITAM application 112 may generate a command to generate a service ticket. In such examples, the ITAM application 112 may send the command to the service ticket generation component 118 of the remote service provider(s) 106. The service ticket generation component 118 may be configured to generate service tickets for assets that are at risk of being out of compliance or are out of compliance, such as based on receiving the command.

In some examples, based on the instruction to automatically generate the service ticket, the ITAM application 112 may parse files (e.g., documents, emails, etc.) to determine the risk data 104 that is relevant for service ticket generation. As discussed above, in some examples, the risk data 104 may be provided in the text of the email, such as via a hyperlink. In such examples, the ITAM application 112 may access the hyperlink to determine the relevant risk data 104. In some examples, the risk data 104 may be provided in a document attached to the email. In such examples, the ITAM application 112 may be configured to parse the document to determine the relevant risk data 104 included therein. In some examples, the risk data 104 may be provided in a file format (e.g., .csv file). In such examples, the ITAM application 112 may access the file to determine the relevant risk data 104.

In various examples, the ITAM application 112 may send the relevant risk data 104 to the service ticket generation component 118. In some examples, the ITAM application 112 may be configured to automatically input items of risk data (e.g., asset identifier, asset user identifier, reason for non-compliance, etc.) in appropriate input blocks, such as an ITAM system manager 116 would do if generating the service ticket manually. The ITAM application 112 performs the steps with regard to risk data 104 input that were previously performed manually. Accordingly, the techniques described herein significantly improve a service ticket generation process.

In various examples, the ITAM computing device(s) 102 may include an application programming interface (API) configured to share data between the ITAM application 112 and the remote service provider 106 computing devices. In such examples, the API may input the relevant risk data 104 into the service ticket generation component 118, such as to automate the service ticket generation process.

Responsive to receiving the relevant input from the ITAM application 112, the service ticket generation component 118 may generate the service ticket. A service ticket may include data associated with the asset, the risk (at risk or out of compliance), a deadline associated with compliance, the associated policy and/or regulation, and any other information associated with the asset and/or risk data 104. In some examples, the service ticket generation component 118 may assign a service ticket identifier (e.g., numbers, letters, symbols) to a particular service ticket in order to identify the particular service ticket. In such examples, the service ticket may include the service ticket identifier. Additionally, the service ticket may include at least a portion of the risk data 104 associated with the asset.

In some examples, the service ticket generation component 118 may determine a mitigation task associated with the asset, such as to ensure the asset stays in compliance (for assets at risk of being out of compliance) or to bring the asset back into compliance (for assets out of compliance). In some examples, a service ticket generated by the service ticket generation component 118 may include the mitigation task.

In examples in which the asset is out of compliance, the service ticket may include a report of non-compliance. In such examples, the report of non-compliance may include a risk response used to notify a user of the asset that the asset is out of compliance. In some examples, the service ticket generation component 118 may store service tickets and risk data 104 associated therewith in a datastore. In some examples, the service ticket generation component 118 may be configured to perform analytics regarding compliance of assets within an organization. In such examples, the service ticket generation component 118 may provide an analytical report to the ITAM computing device(s) 102 and/or computing device(s) 108 periodically (e.g., monthly, annually, etc.) and/or based on receiving a request therefor. The analytics may include qualitative and/or quantitative data regarding IT asset compliance associated with an organization. The analytical report may assist an ITAM system manager 116 and/or the organization in tracking IT compliance issues.

In various examples, the service ticket generation component 118 may be configured to provide, to the ITAM computing device(s) 102 and/or the computing device(s) 108 service ticket data 114. In such examples, the service ticket generation component 118 may send the service ticket data 114 responsive to receiving input from the ITAM computing device(s) 102. In some examples, the service ticket data 114 may include the entire service ticket. In such examples, the service ticket generation 118 component may send all of the data associated with the service ticket to the ITAM computing device(s) 102 and/or the computing device(s) 108. In some examples, the service ticket data 114 may include a portion of the data associated with the service ticket. In such examples, the service ticket data 114 may include data sufficient for an asset user or other individual to access the service ticket via the remote service provider(s) 106. For example, the service ticket data 114 may include the identifier associated with the service ticket. The asset user may receive the identifier and may access the remote service provider(s) 106 to determine the mitigation task (e.g., what needs to be done to ensure compliance with the policy and/or regulation).

In some examples, the ITAM computing device(s) 102 may receive the service ticket data 114 and may present the service ticket data 114 via the ITAM application 112. In some examples, the ITAM computing device(s) 102 and/or the ITAM application 112 may determine an asset user associated with the service ticket data 114. The asset user may be determined based on risk data associated with the service ticket data 114, an asset user identifier associated with the service ticket data 114, or the like. The ITAM computing device(s) 102 and/or the ITAM application 112 may then send the service ticket data 114 to a computing device associated with the asset user, such as computing device 108(N).

In some examples, the ITAM application 112 may receive mitigation data 120 from one or more computing device(s) 108. The mitigation data 120 may include an indication that a mitigation task associated with a service ticket has been completed. In some examples, the ITAM application 112 may store the mitigation data 120 in a database associated with asset compliance. In some examples, the ITAM application 112 may be configured to close the service ticket associated therewith. In some examples, the ITAM application 112 may access the remote service provider 106 and may send the mitigation data 120 and/or the indication that the mitigation task has been completed. In some examples, the ITAM application 112 may cause the service ticket to be closed automatically (e.g., without ITAM system manager 116 input).

In some examples, the ITAM application 112 may surface a representation of the mitigation data 120 via the user interface. Based on the representation, the ITAM system manager 116 may provide an input for the ITAM application 112 to close the service ticket. Responsive to receiving the input, the ITAM application 112 may access the service ticket generation component 118 or other component of the remote service provider(s) 106 computing device(s) and may cause the service ticket to be closed. In some examples, the remote service provider 106 may store data associated with the closed service ticket in a datastore.

In some examples, the asset user and/or computing device 108 associated therewith may cause the service ticket to be closed. In such examples, the computing device 108 may send the mitigation data 120 directly to the remote service provider(s) 106. Responsive to receiving the mitigation data 120, the service ticket generation component 118 or other component of the remote service provider(s) 106 may close the service ticket and/or store data associated therewith in a datastore.

Figure 2:
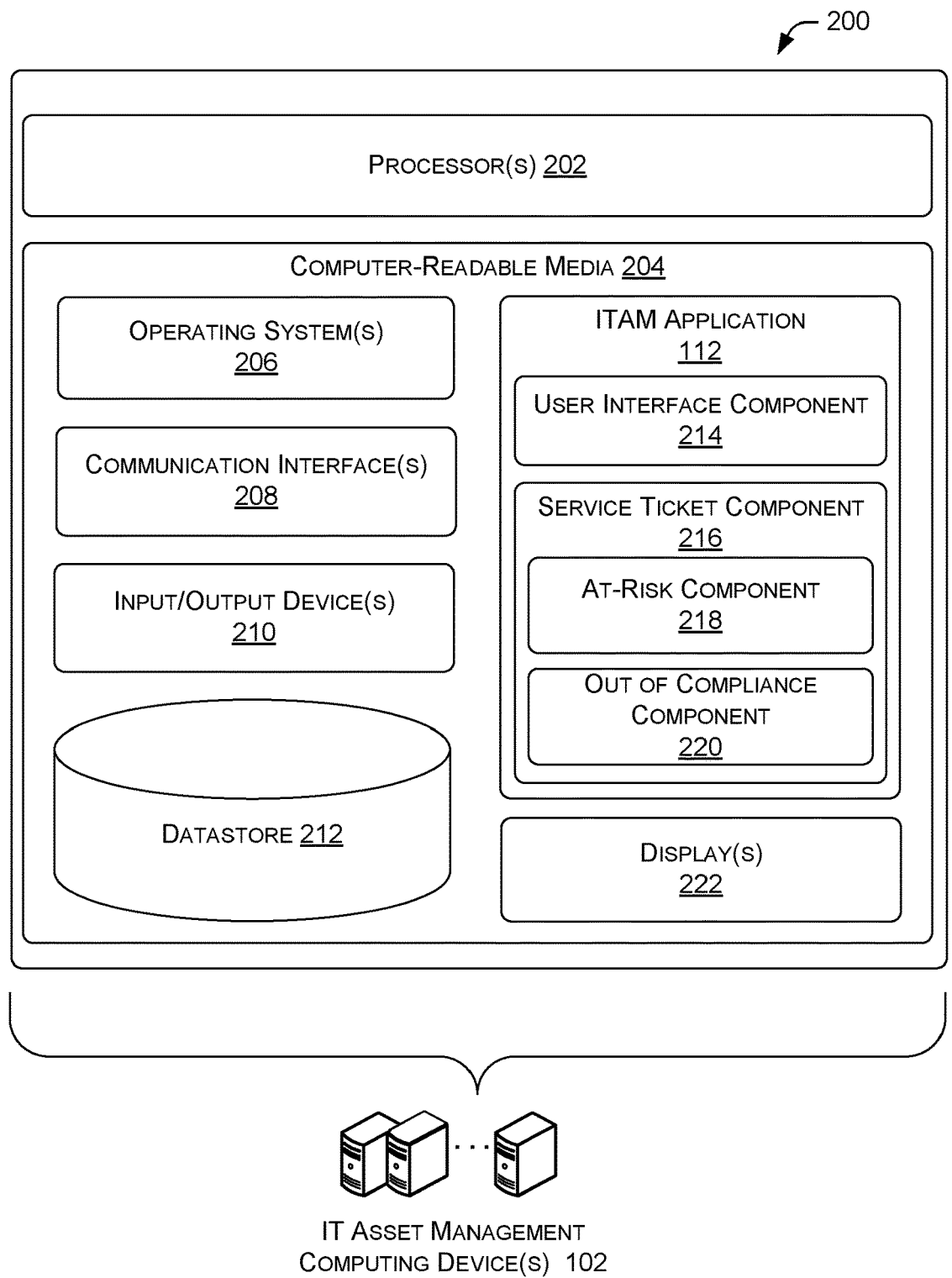
FIG. 2 is a block diagram of an illustrative computing architecture of a computing device associated with an information technology asset management service provider, as described herein.

FIG. 2 is a block diagram of an illustrative computing architecture 200 of the ITAM computing device(s) 102. The computing architecture 200 may each be implemented in a distributed or non-distributed computing environment.

The computing architecture 200 may include one or more processors 202 and one or more computer-readable media 204 that stores various components, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media appropriate for storing electronic instructions. In addition, in some examples the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 2, in some configurations, the computer-readable media 204 may store an operating system 206, one or more communication interface(s) 208, one or more input/output (I/O) interface(s) 210, and a datastore 212, which are described in turn. The components may be stored together or in a distributed arrangement. The operating system 206 may enable control and management of various functions of the ITAM computing device(s) 102 and the ITAM application 112, as described herein.

The communication interface(s) 208 may include one or more interfaces and hardware components for enabling communication with various other devices, such as over the network(s) 110 or directly. For example, communication interface(s) 208 may enable communication through one or more network(s) 110, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth R, BLE, NFC, RFID, a wired network, or any other such network, or any combination thereof. Accordingly, network(s) 110 may include both wired and/or wireless communication technologies, including Bluetooth R, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The ITAM computing device(s) 102 may further include the one or more I/O devices 210. The I/O device(s) 210 may include speakers, a microphone, a camera, and various user controls (e.g., buttons, a joystick, a keyboard, a keypad, etc.), a haptic output device, and so forth. In some examples, the I/O device(s) 210 may enable a user, such as ITAM system manager 116 of FIG. 1, to input data and/or instructions to run automation systems associated with the ITAM application 112. For example, an ITAM system manager may input a login alias and password associated with a remote service provider, such as remote service provider 106. The ITAM system manager may additionally input an instruction to run automation, such as to automatically generate a service ticket associated with an asset that is determined to be at risk of being out of compliance or is currently (e.g., at a time of the service ticket generation) out of compliance.

As illustrated in FIG. 2, the ITAM application 112 may include a user interface component 214. The user interface component 214 may include one or more user interfaces via which an ITAM service manager or other user may cause a service ticket to be automatically generated. Various of the one or more user interfaces are described below; with respect to FIGS. 3-5.

In some examples, the ITAM application may include a service ticket component 216. In some examples, the service ticket component 216 may be configured to process risk data associated with an asset, such as risk data 104. The service ticket component 216 may determine whether an asset is at risk of being out of compliance or is out of compliance. In some examples, the service ticket component 216 may make the determination regarding compliance based on a means by which the risk data associated therewith is transmitted to the ITAM application. For example, the compliance determination component may receive an email including risk data and the service ticket component 216 may determine that the associated asset is out of compliance with a policy and/or a regulation. For another example, the service ticket component 216 may receive risk data in a .csv file and may determine that the associated asset is at risk of being out of compliance with a policy and/or a regulation.

In various examples, the service ticket component 216 may include an at-risk component 218. In such examples, the at-risk component 218 may be configured to parse files to determine relevant risk data associated with an asset that is at risk of being out of compliance. The at-risk component 218 may receive log in information associated with a remote service provider that corresponds to assets that are at risk of being out of compliance. In some examples, responsive to receiving an instruction to automatically generate a service ticket, the at-risk component 218 may access a remote service provider computing device associated with assets that are at risk of being out of compliance. In some examples, responsive to receiving the instruction, the at-risk component 218 may generate a command to generate a service ticket associated with the asset. In some examples, the command may include relevant risk data associated with the asset. In some examples, the command may cause the relevant risk data to be input into a service ticket generation component of the remote service provider computing device. In some examples, the command may cause the service ticket generation component to generate the service ticket. Based at least in part on the command (e.g., based on the input of the relevant risk data) the at-risk component 218 may receive the service ticket or a portion thereof. In some examples, the at-risk component 218 may receive an identifier associated with the service ticket. In some examples, the at-risk component 218 may cause an indication of the service ticket (e.g., the service ticket identifier, an asset identifier, etc.) to be presented or otherwise displayed on a display 222, such as via the user interface component 214.

In various examples, the service ticket component 216 may include an out of compliance component 220. In such examples, the out of compliance component 220 may be configured to parse electronic mail messages and/or attachments thereto to determine relevant risk data associated with an asset that is out of compliance. The out of compliance component 220 may receive log in information associated with a remote service provider that corresponds to assets that are out of compliance. In some examples, responsive to receiving an instruction to automatically generate a service ticket regarding the asset that is out of compliance, the out of compliance component 220 may access a remote service provider computing device associated with assets that are out of compliance. The out of compliance component 220 may input relevant risk data associated with an asset into a service ticket generation component of the remote service provider computing device. After inputting the relevant risk data, the out of compliance component 220 may receive the service ticket or a portion thereof. In examples in which the asset is out of compliance, the service ticket may include a record of non-compliance. In some examples, the record of non-compliance may be stored in the datastore 212 of the ITAM computing device(s) 102. In some examples, the out of compliance component 220 may receive an identifier associated with the service ticket. In some examples, the out of compliance component 220 may cause an indication of the service ticket (e.g., the service ticket identifier, an asset identifier, etc.) to be presented or otherwise displayed on a display 222, such as via the user interface component 214.

In various examples, the service ticket component 216 may cause the service ticket identifier and/or the service ticket to be sent to a computing device associated with an asset user. In such examples, the asset user may review the service ticket and perform an associated mitigation task. In some examples, the asset user may send, via the computing device associated therewith, an indication of compliance with the policy and/or regulation associated with the service ticket. In such examples, the asset user and/or computing device associated therewith may perform a mitigation task to ensure the asset remains in compliance or brings the asset back into compliance with the policy and/or regulation. In various examples, the ITAM computing device(s) 102 may transmit the indication that the mitigation task was completed to an associated remote service provider computing device. In some examples, the ITAM computing device(s) 102 may store the indication that the mitigation task was completed in the datastore 212.

The datastore 212 may store at least some data including, but not limited to, data collected from the ITAM application 112, including data associated with risk data, asset user data, asset data, service tickets, records of non-compliance, and the like. In some examples, the data may be automatically added via a computing device (e.g., device(s) 108). Risk data may include an asset identifier, an asset user (e.g., individual responsible for the asset), a type of asset (e.g., hardware, software, etc.), a reason associated with a compliance risk (e.g., out of compliance or at risk of being out of compliance), a deadline associated with compliance, and the like of an asset that is at risk of being out of compliance or is out of compliance with a policy and/or a regulation. Asset user data may include data associated with an individual responsible for the IT user asset (e.g., organization, department, name, user identifier, address, office number, etc.). Asset data may include a type of asset (e.g., hardware, software, etc.), an asset identifier, asset location, associated department, associated organization, or the like.

As discussed above, risk data and/or a generated service ticket (or indication thereof (i.e., identifier)) may be presented or otherwise displayed via one or more displays 222. Depending on the type of computing device(s) used as the ITAM computing device(s) 102, the display(s) 222 may employ any suitable display technology. For example, the display(s) 222 may be a liquid crystal display, a plasma display, a light emitting diode display, an OLED (organic light-emitting diode) display, an electronic paper display, or any other suitable type of display able to present digital content thereon. In some examples, the display(s) 222 may have a touch sensor associated with the display(s) 222 to provide a touchscreen display configured to receive touch inputs for enabling interaction with a graphic interface presented on the display(s) 222. Accordingly, implementations herein are not limited to any particular display technology.

Figure 3:
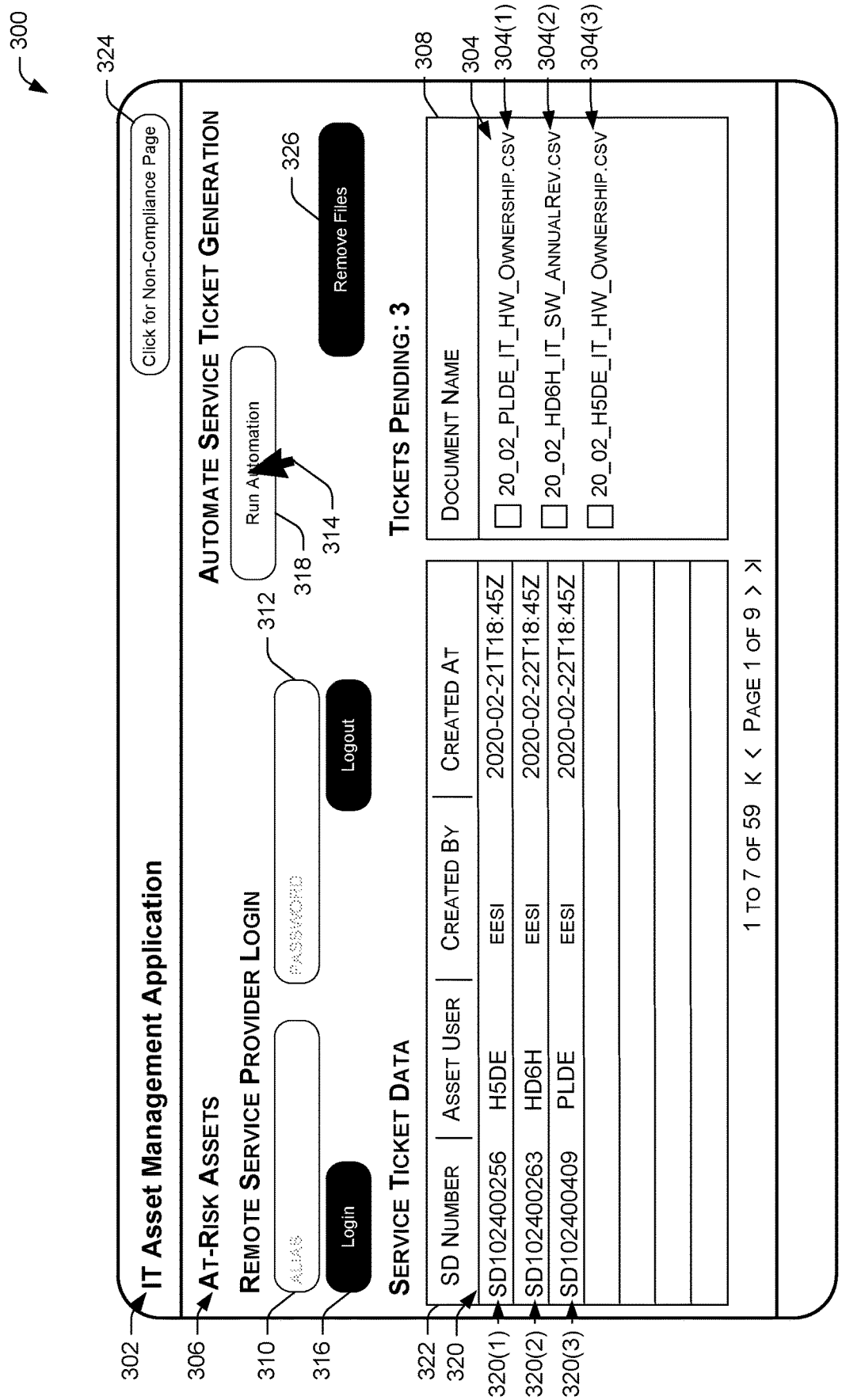
FIG. 3 illustrates an example user interface associated with an information technology asset management application used to automatically generate a service ticket associated with an information technology asset that is at risk of being out of compliance, as described herein.

FIG. 3 illustrates an example user interface (UI) 300 of a device, such as an ITAM computing device (e.g., ITAM computing 102). The UI 300 may be associated with an ITAM application 302, such as ITAM application 112, and may be used to automatically generate a service ticket associated with an IT asset that is at risk of being out of compliance with a policy and/or regulation.

As discussed above, the device may receive risk data associated with one or more assets. The risk data may be sent as a may be sent via a tabular file (e.g., comma-separated value (.csv) file, an Excel (.xls) file, etc.), an electronic mail (email) message (e.g., in the text thereof, a hyperlink, an attachment (e.g., .pdf file, .docx file, etc.) and/or any other type of file capable of being read and/or having data parsed therefrom. In various examples, the ITAM application 302 may determine a format associated with a file 304 including incoming risk data and determine that the file 304 includes risk data associated with an asset that is at risk of being out of compliance. Responsive to determining that the file 304 is associated with an asset that is at risk of being out of compliance, the ITAM application 302 may cause the file 304 to be presented or otherwise displayed via an at-risk assets page 306.

In some examples, responsive to receiving the file 304 and/or responsive to determining that the file 304 is associated with the asset that is at risk of being out of compliance, the ITAM application 302 may present an identifier associated with the file 304, such as an asset identifier, an asset user identifier, or other file name in a service tickets pending window 308 of the user interface 300. In some examples, a file 304, such as file 304(1) may be associated with a single asset that is at risk of being out of compliance. In some examples, the file 304(1) may be associated with two or more assets used and/or managed by a particular asset user (e.g., owner or individual otherwise responsible for the asset).

In the illustrative example, the identifier associated with a first file 304(1), a second file 304(2), and a third file 304(3) include a date, an asset user identifier, an asset type, and a brief description of the compliance issue. For example, file 304(1) includes a date of February 20, an asset user identifier of PLDE, an asset type of hardware, and an indication that the compliance risk is associated with ownership of the asset. For another example, file 304(2) includes a date of February 20, an asset user identifier of HD6H, an asset type of software and an indication that the compliance risk is associated with an annual review of the software asset.

As illustrated, the UI 300 may include a first input control 310 and a second input control 312 configured to receive user input associated with access to a remote service provider. In other examples, the UI 300 may include a greater or fewer number of input controls. The user input may include login information associated with logging into the remote service provider. In the illustrative example, the first input control 310 includes a means by which a user 314 (e.g., ITAM system manager) may input an alias and the second input control 312 includes a means by which the user 314 may input a password associated with the remote service provider.

In some examples, the UI 300 may include a login command 316. In such examples, responsive to receiving input via the first input control 310, the second input control 312, and the login command 316, the ITAM application 302 may access (e.g., log into) the remote service provider associated with generating service tickets associated with at-risk assets. In some examples, the UI 300 may include an automation selectable option 318 to automatically generate the service ticket. In some examples, responsive to receiving an input via the automation selectable option 318, the ITAM application 302 may automatically login to the remote service provider, such as based on input provided via the first input control 310 and/or the second input control 312. In some examples, the ITAM application 302 may automatically login to the remote service provider based on login information associated with the user 314 stored in a datastore, such as datastore 212.

In various examples, responsive to receiving an input via the automation selectable option 318 (e.g., an instruction to automatically generate a service ticket), the ITAM application 302 may parse a file 304, such as file 304(1), for risk data relevant to generating a service ticket for the associated asset. As discussed above, the ITAM application 302 may cause one or more input fields of a service ticket generation component of the remote service provider to be filled based on the risk data. For example, the ITAM application 302 may input data associated with the asset, asset user, deadline, and a reason that the asset is at risk. The ITAM application 302 may also send an instruction to the remote service provider to generate a service ticket based on the risk data. Additionally, or in the alternative, the device associated with the ITAM application 302 may include an application programming interface via which relevant risk data may be provided to the remote service provider in order to generate the service ticket.

In various examples, based on the input via the automation selectable option 318, the ITAM application 302 may process the files 304 in the service tickets pending window 308 and generate service tickets associated therewith. The ITAM application 302 may present an indication 320 of the service tickets via a service ticket window 322, such as a first indication 320(1), a second indication 320(2), and a third indication 320(3). In the illustrative example, the indication 320 includes a service ticket identifier (e.g., SD number), an asset user identifier, a department associated with service ticket (e.g., identifier associated with a creator of the service ticket, identifier associated with a creator of the file, etc.), and a time associated with the service ticket creation. In other examples, the service tickets pending window 308 may display a greater or lesser amount of information associated with the service tickets.

In the illustrative example, the ITAM application 302 processes the files 304 (e.g., parses file 304 for risk data, generates service ticket, surfaces indication of service ticket) in order, from top to bottom, such that a first file 304(1) is processed first and is displayed as a third indication 320(3) of the service ticket, and a third file 304(3) is processed third and is displayed as the first indication 320(1). In other examples, the ITAM application 302 may process the files 304 in another order, such as bottom to top, a random order, based on a date or identifier associated therewith, or the like. For example, the ITAM application 302 may present only a service ticket identifier associated with the service ticket. In such an example, a user 314 may access the service ticket via the remote service provider using the service ticket identifier.

In various examples, the ITAM application 302 may cause an instance of the service ticket to be saved on a datastore of the associated computing device. In some examples, responsive to selection of a (service ticket) indication 320, the ITAM application 302 may present the service ticket via the UI 300. As discussed above, in some examples, the ITAM application 302 may send the service ticket or a portion thereof (e.g., service ticket identifier) to a computing device associated with an asset user. In such examples, the ITAM application 302 may determine the asset user associated with a service ticket and may cause the service ticket or portion thereof to be sent to the computing device associated therewith.

In some examples, the UI 300 may include a transition selectable option 324 to enable the user 314 to easily transition from the at-risk assets page 306 to a page associated with out of compliance assets. The page associated with out of compliance assets will be discussed in further detail below with regard to FIG. 5.

Figure 4:
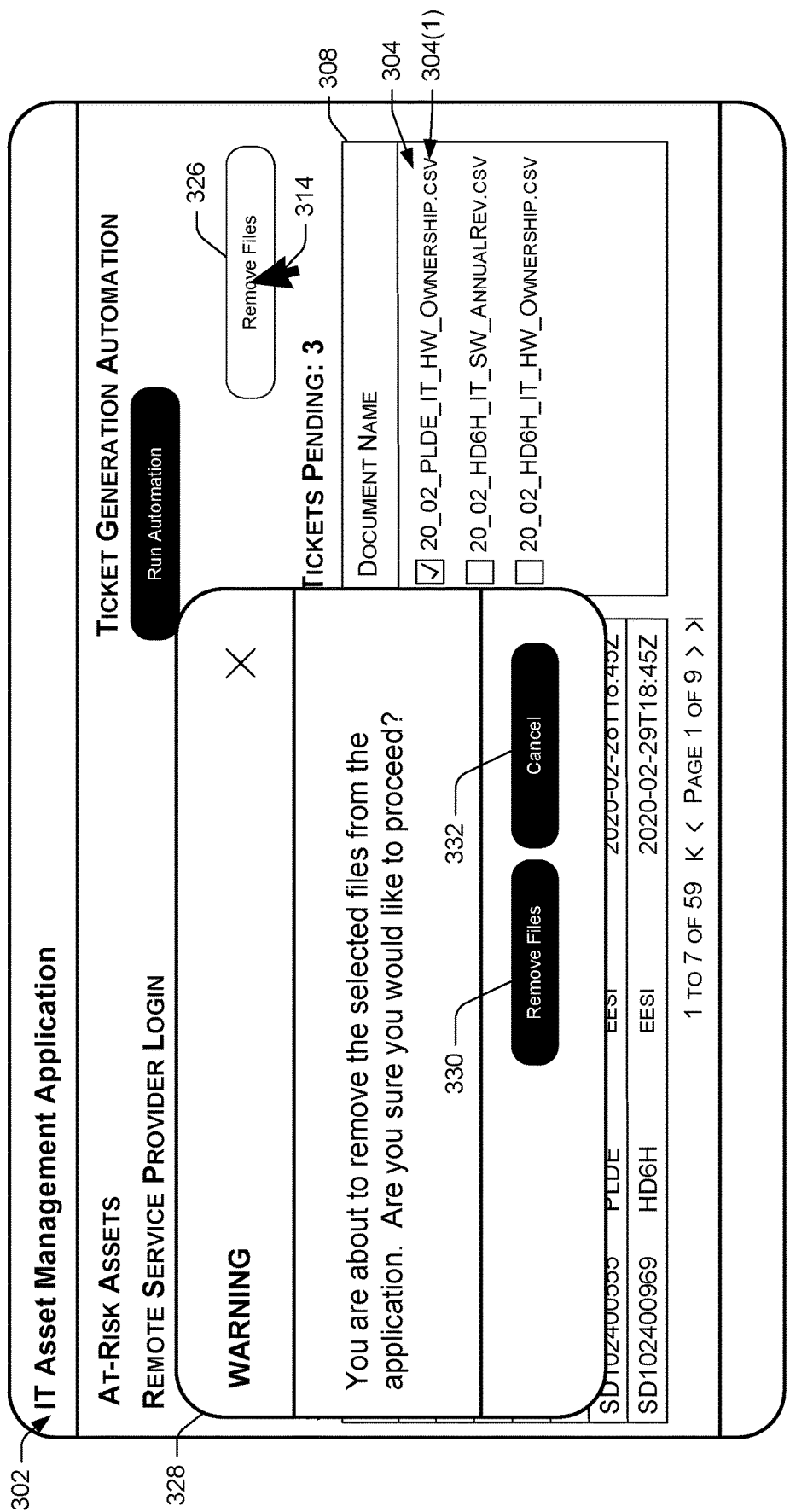
FIG. 4 illustrates the example user interface associated with the information technology asset management application of FIG. 3, including a notification associated with file removal, as discussed herein.

In various examples, the UI 300 may include a file removal selectable option 326. The file removal selectable option 326 may be used to remove one or more files 304 from the service tickets pending window 308. As illustrated in FIG. 4, responsive to an input via the file removal selectable option 326 (e.g., user 314 clicks on the file removal selectable option 326), the ITAM application 302 may present a notification 328 to verify file removal. In some examples, the user 314 may remove a file 304 after service tickets associated therewith have been generated. In some example, the user 314 may remove a file after determining that a service ticket is not required for the asset. For example, the user 314 may determine that a mitigation task associated with a compliance issue corresponding to a file 304 has been completed and that a service ticket is not necessary.

In the illustrative example, the notification 328 includes a confirmation selectable option 330 to confirm a removal of the file 304 and a cancel selectable option 332, to cancel the file 304 removal. In various examples, the notification 328 may provide a verification to ensure that the user 314 does not accidentally remove files associated with assets that may be at risk of being out of compliance (and/or those that are out of compliance).

Figure 5:
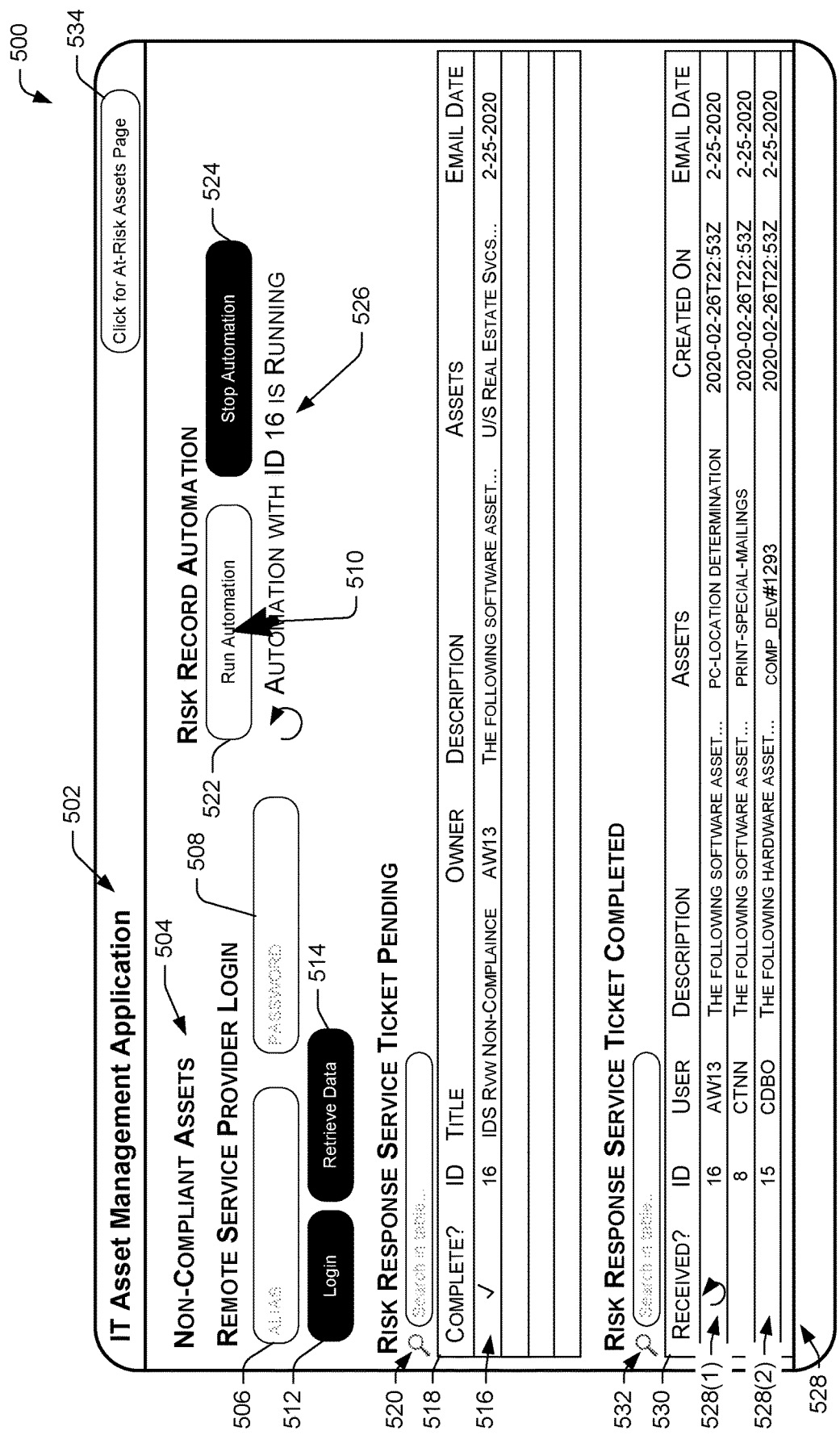
FIG. 5 illustrates an example user interface associated with an information technology asset management application used to automatically generate a service ticket associated with an information technology asset that is out of compliance, as described herein.

FIG. 5 illustrates an example user interface (UI) 500 of a device, such as an ITAM computing device (e.g., ITAM computing 102). The UI 500 may be associated with an ITAM application 502, such as ITAM application 112 and ITAM application 302, and may be used to automatically generate a service ticket associated with an IT asset that is out of compliance with a policy and/or regulation. Data associated with the assets that are out of compliance may be processed via a non-compliant assets page 504 of the ITAM application 502.

In the illustrative example, the UI 500 may include a first input control 506 and a second input control 508 configured to receive user input associated with access to a remote service provider associated with assets that are out of compliance. In other examples, the UI 500 may include a greater or fewer number of input controls. The user input may include login information associated with logging into the remote service provider. In the illustrative example, the first input control 506 includes a means by which a user 510 (e.g., ITAM system manager) may input an alias and the second input control 508 includes a means by which the user 510 may input a password associated with the remote service provider.

In some examples, the UI 500 may include a login command 512. In such examples, responsive to receiving input via the first input control 506, the second input control 508, and the login command 512, the ITAM application 502 may access (e.g., log into) the remote service provider associated with generating service tickets associated with non-compliant assets. In some examples, responsive to receiving an input via the login command 512, the ITAM application 502 may automatically login to the remote service provider, such as based on input provided via the first input control 506 and/or the second input control 508. In some examples, the ITAM application 502 may automatically login to the remote service provider based on login information associated with the user 510 stored in a datastore, such as datastore 212.

In some examples, the UI 500 may include a data retrieval selectable option 514 to retrieve risk data provided to the ITAM application 502. In some examples, responsive to receiving an input via the data retrieval selectable option 514, the ITAM application 502 may determine whether one or more emails including risk data have been received and/or are stored on a datastore. In some examples, the ITAM application 502 may determine that the email(s) include risk data based on a sender associated with the email (e.g., sender associated with a computing device configured to generate compliance reports), data included in a subject of the email (e.g., asset past due, compliance deadline approaching, etc.), data included in a text of the email (e.g., hyperlink to asset data, etc.), data included in an attached document (e.g., document title includes compliance data, etc.), etc. For example, the ITAM application 502 may receive an email from "HOME-ASSET-COMPLIANCE-MAIL" and may determine that the email includes risk data associated with an IT asset that is out of compliance. The ITAM application 502 may parse the email for risk data based at least in part on the sender. For another example, the email may include a subject line of "Asset annual Review is past due as per the IDS standard." Based on the subject line, the ITAM application 502 may determine that the email includes risk data associated with an IT asset that is out of compliance with an annual review:

In some examples, responsive to receiving an input via the data retrieval selectable option 514, the ITAM application 502 may parse the emails to determine risk data associated with an asset that is out of compliance. In examples in which the associated asset is hardware, the ITAM application 502 may parse a document attached to an email to determine the risk data. In examples in which the associated asset is software, the ITAM application 502 may parse a text of the email and/or access a hyperlink associated therewith to determine the risk data.

In various examples, based on determining the risk data associated with assets that are out of compliance, the ITAM application may present a label of risk data 516 to be presented via a risk response service ticket pending window 518. The label of risk data 516 may include sufficient risk data to enable a user (e.g., ITAM system manager) to determine an asset that is out of compliance. In the illustrative example of FIG. 5, the label risk data 516 includes an identifier, a title, an owner (e.g., asset user), a type of asset, a description of the asset, and a date associated with the received email. In other examples, more or less risk data may be presented via the risk response service ticket pending window 518.

In some examples, the risk response service ticket pending window 518 may include a first search input control 520. The first search input control 520 may enable the user 510 to search for a particular label of risk data 516 (e.g., asset associated therewith). In some examples, based on an input via the first search input control 520, the ITAM application 502 may search and/or filter for a particular pending service ticket. In some examples, based on the search, the ITAM application 502 may surface a label of risk data 516 associated with the asset. For example, a user may input an identification number of "16" in the first search input control 520, the ITAM application may present the label of risk data 516 in the risk response service ticket pending window 518.

In the illustrative example, the UI 500 may include an automation selectable option 522 via which a user may submit an instruction to automatically generate a service ticket associated with an out of compliance asset (also referred to herein as a (risk response" or "risk record"). In various examples, responsive to receiving an input via the automation selectable option 522 (e.g., an instruction to automatically generate a service ticket), the ITAM application 502 may parse an email for risk data relevant to generating a service ticket for the associated asset. As discussed above, in some examples, the ITAM application 502 may parse the email responsive to input via the data retrieval selectable option 514. In such examples, responsive to receiving the input via the automation selectable option 522, the ITAM application 502 may access the remote service provider associated with non-compliant assets.

The ITAM application 502 may cause one or more input fields of a service ticket generation component of the remote service provider to be filled based on the risk data. For example, the ITAM application 502 may input data associated with the asset, asset user, deadline, and a reason that the asset is at risk. The ITAM application 502 may also send an instruction to the remote service provider to generate a service ticket based on the risk data. Additionally, or in the alternative, the device associated with the ITAM application 502 may include an application programming interface via which relevant risk data may be provided to the remote service provider in order to generate the service ticket.

At any time during the service ticket generation, the user 510 may stop the service ticket generation process by selecting the stop automation selectable option 524. In some examples, the UI 500 may include a status indicator 526 associated with service ticket generation. In the illustrative example, the status indicator 526 includes an indication of whether the service ticket has been received, an asset identifier corresponding to an asset for which a service ticket is currently being generated. In other examples, the status indicator 526 may include an estimated time to complete the pending service tickets displayed in risk response service ticket pending window 518 and/or any other information to inform the user 510 of a status of the automatic service ticket generation process.

The ITAM application 502 may present an indication 528 of the service tickets, such as first indication 528(1) and second indication 528(2), via a risk response service ticket completed window 530. In some examples, the indication 528 may include an indication of whether the service ticket has been received (or is currently pending). For example, the indication 528(1) indicates that the service ticket associated with the asset identifier "16" has not yet been received (e.g., is currently being generated). For another example, the indication 528(2) indicates that the service ticket associated with the asset identifier "15" has been received. In the illustrative example, the indicator also includes the asset identifier, an asset user identifier, a description of the asset (e.g., an asset type) and/or description of the non-compliance, a date/time associated with service ticket creation, and a data associated with an email. Though this is not intended to be so limiting and additional or alternative data may be included in the indication 528.

In various examples, the ITAM application 502 may cause an instance of the service ticket to be saved on a datastore of the associated computing device. In some examples, responsive to selection of a (service ticket) indication 528, the ITAM application 502 may present the service ticket via the UI 500. As discussed above, in some examples, the ITAM application 502 may send the service ticket or a portion thereof (e.g., service ticket identifier) to a computing device associated with an asset user. In such examples, the ITAM application 502 may determine the asset user associated with a service ticket and may cause the service ticket or portion thereof to the computing device associated therewith.

In some examples, the risk response service ticket completed window 530 may include a second search input control 532. The second search input control 532 may enable the user 510 to search for a particular service ticket (e.g., indication 528 thereof, asset associated therewith). In some examples, based on an input via the second search input control 532, the ITAM application 502 may search and/or filter for a particular completed service ticket. In some examples, based on the search, the ITAM application 502 may surface a service ticket indication 528 associated with the asset. For example, a user may input an identification number of "15" in the second search input control 532, the ITAM application 502 may present the service ticket indication 528 in the risk response service ticket completed window 530.

In some examples, the UI 300 may include a transition selectable option 534 to enable the user 314 to easily transition from the non-compliant assets page 504 to an at-risk assets page, such as at-risk assets page 306.

Figure 6:
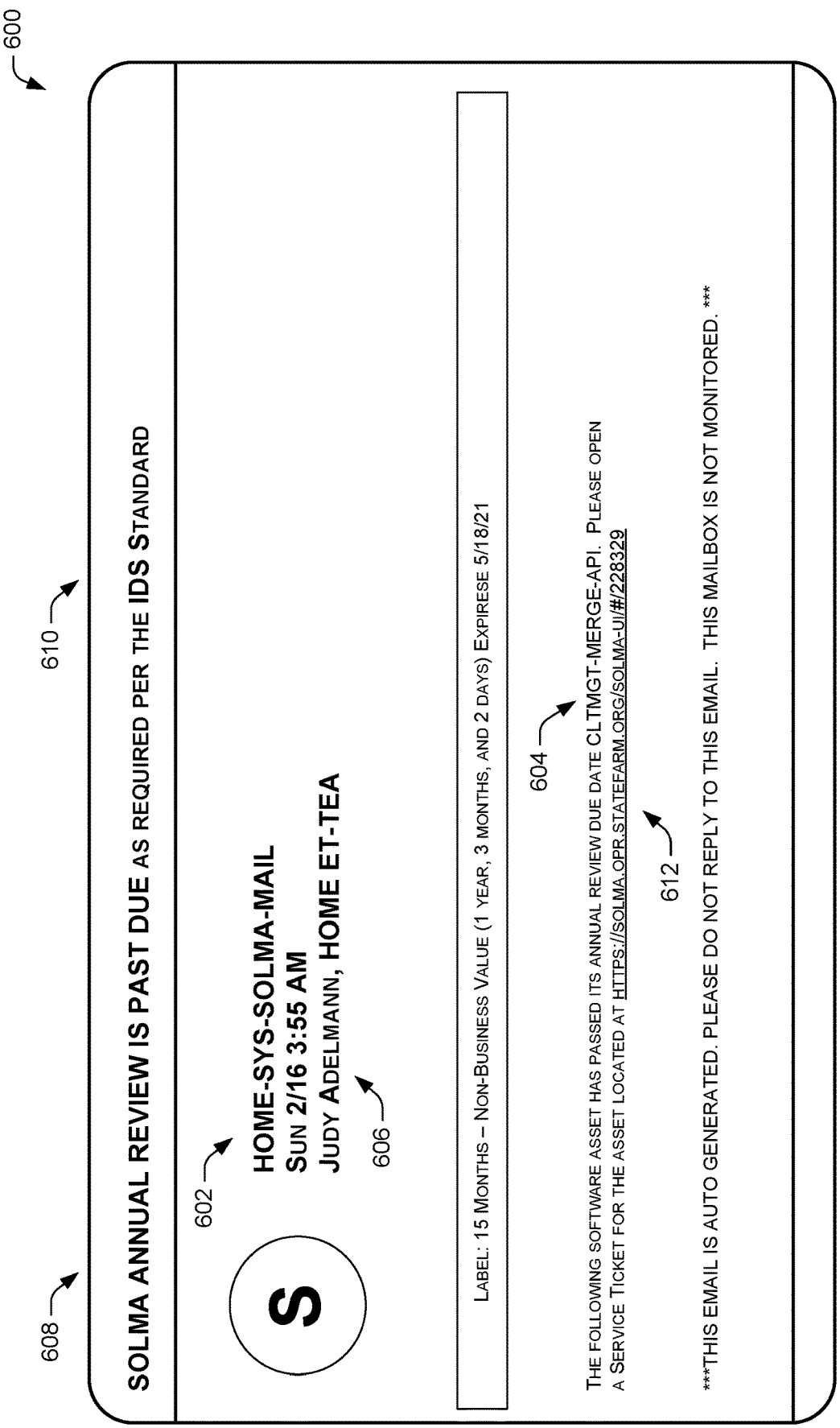
FIG. 6 illustrates an example electronic mail message including risk data associated with a software asset that is out of compliance, as described herein.

FIG. 6 illustrates an example electronic mail message 600 (referred to herein as email 600) including risk data associated with a software asset that is out of compliance, as described herein. The email 600 includes a sender 602. The sender 602 may include an email address associated with a computing device that determined that the asset 604 was out of compliance. In some examples, the computing device may generate a report periodically (e.g., monthly, weekly, etc.) and/or when instructed by a user to determine one or more assets 604 that are out of compliance.

In some examples, responsive to determining that the asset 604 is out of compliance, the sender 602 may generate the email 600 and send it to an ITAM computing device for service ticket generation. In some examples, the email 600 may additionally be sent to an asset user 606 associated with the asset 604.

In some examples, the email may include a description of a compliance issue 608 (e.g., reason the asset 604 is out of compliance). In some examples, the email 600 may include a policy and/or regulation 610 associated therewith. For example, the asset 604 may be overdue for an annual review required per an internal document software system.

In various examples, the email 600 associated with a software asset 604 may include a hyperlink 612. The hyperlink 612 may include a link to data associated with the asset 604, such as a location, an asset identifier, asset user identifier, and the like. In various examples, the hyperlink 612 may include a link to risk data that an ITAM application may use to generate a service ticket (e.g., based on an associated remote service provider requirement).

As discussed above, in some examples, responsive to receiving the email 600, the ITAM application may parse the email and/or access the hyperlink 612 to determine the risk data. In some examples, the ITAM application may parse the email and/or access the hyperlink 612 to determine the risk data responsive to receiving an input via a data retrieval selectable option, such as data retrieval selectable option 514. In some examples, the ITAM application may parse the email and/or access the hyperlink 612 to determine the risk data based on an instruction (e.g., input) to run automation, such as via an automation selectable option (e.g., automation selectable option 524).

Figure 7:
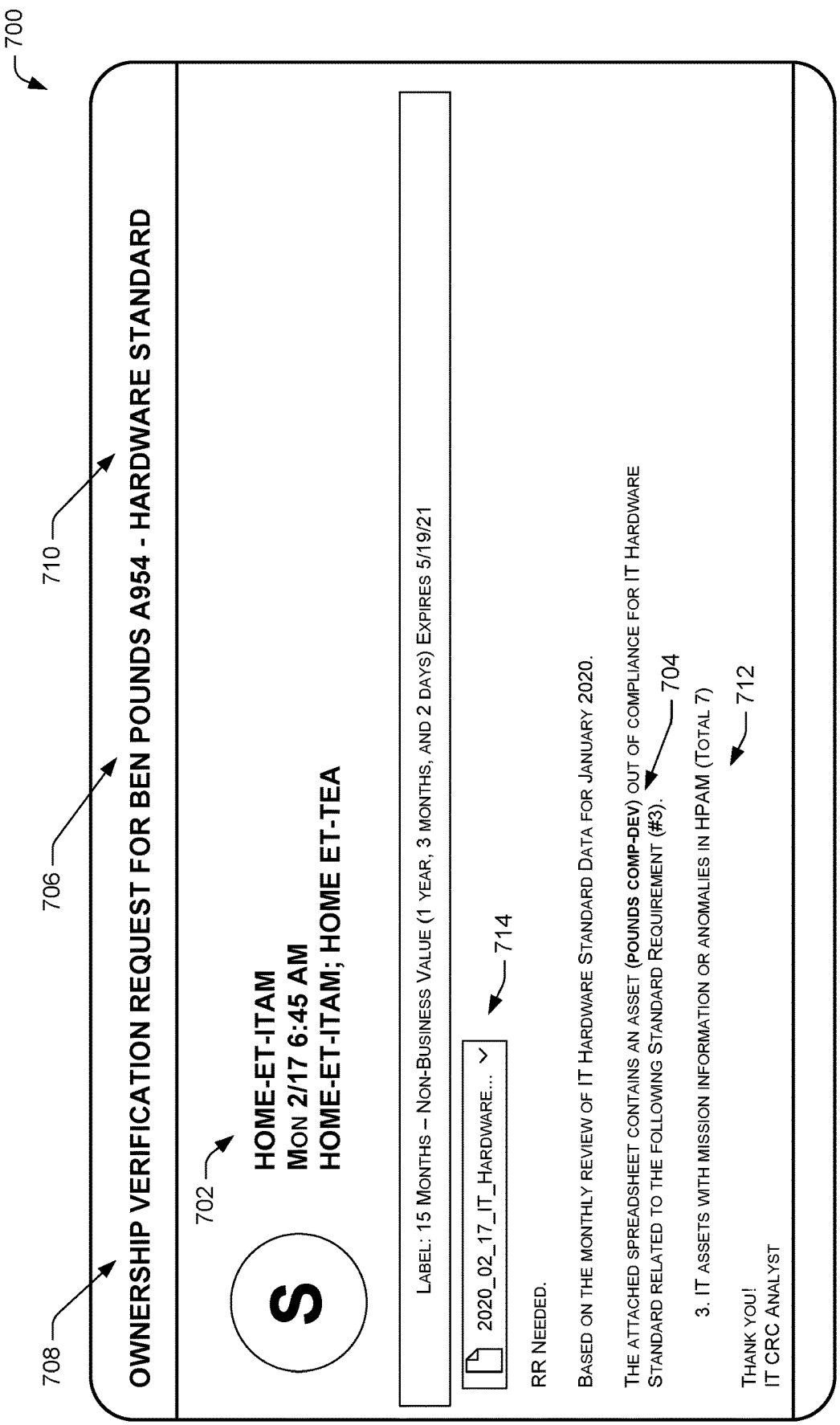
FIG. 7 illustrates an example electronic mail message including risk data associated with a hardware asset that is out of compliance, as described herein.

FIG. 7 illustrates an example electronic mail message 700 including risk data associated with a hardware asset that is out of compliance, as described herein. The email 700 includes a sender 702. The sender 702 may include an email address associated with a computing device that determined that the asset 704 was out of compliance. In some examples, the computing device may generate a report periodically (e.g., monthly, weekly, etc.) and/or when instructed by a user to determine one or more assets 704 that are out of compliance.

In some examples, responsive to determining that the asset 704 is out of compliance, the sender 702 may generate the email 700 and send it to an ITAM computing device for service ticket generation. In some examples, the email 700 may additionally be sent to an asset user 706 associated with the asset 704.

In some examples, the email 700 may include a description of a compliance issue 708 (e.g., reason the asset 704 is out of compliance). In some examples, the email 700 may include a policy and/or regulation 710 associated therewith. For example, the asset 704 may be overdue for an ownership verification review required per a hardware standard. In some examples, the email 700 may include additional data 712 associated with the policy and/or regulation 710. For example, the additional data 712 may include data associated with a particular hardware standard requirement.

In various examples, the email 700 associated with a software asset 704 may include a document 714. The document 714 may include risk data that an ITAM application may use to generate a service ticket (e.g., based on an associated remote service provider requirement). In some examples, the document 714 may include risk data associated with one or more assets 704 associated with a particular asset user 706. For example, the asset user 706 Ben Pounds A954 may be responsible for two IT assets that are out of compliance with the hardware standard 710. The document 714 may include risk data associated with the two IT assets.

As discussed above, in some examples, responsive to receiving the email 700, the ITAM application may parse the email and/or access the document 714 to determine the risk data. In some examples, the ITAM application may parse the email and/or access the document 714 to determine the risk data responsive to receiving an input via a data retrieval selectable option, such as data retrieval selectable option 514. In some examples, the ITAM application may parse the email and/or access the document 714 to determine the risk data based on an instruction (e.g., input) to run automation, such as via an automation selectable option (e.g., automation selectable option 524).

Figure 8:
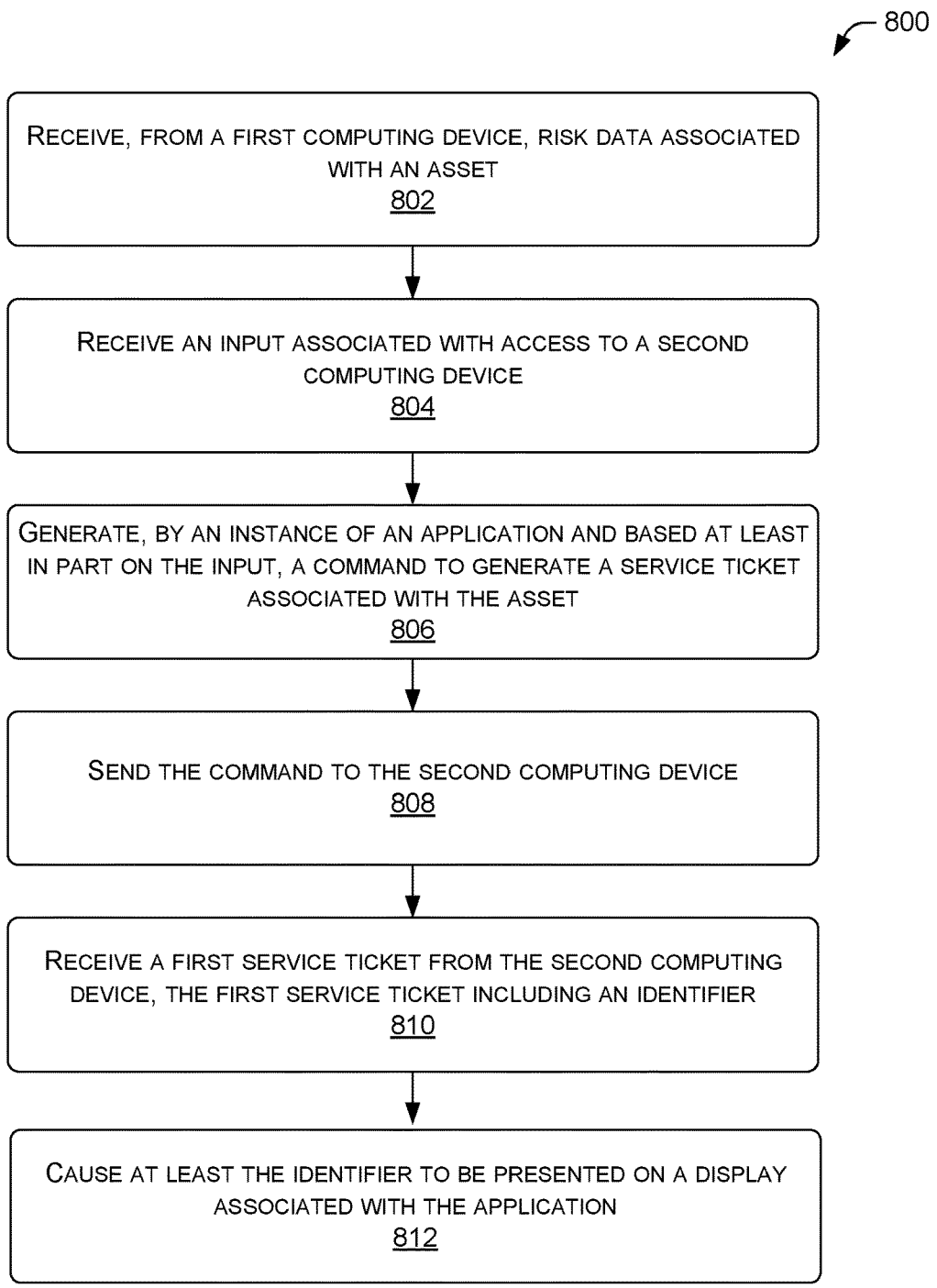
FIG. 8 illustrates an example process for automatically generating a service ticket, as described herein.
Figure 9:
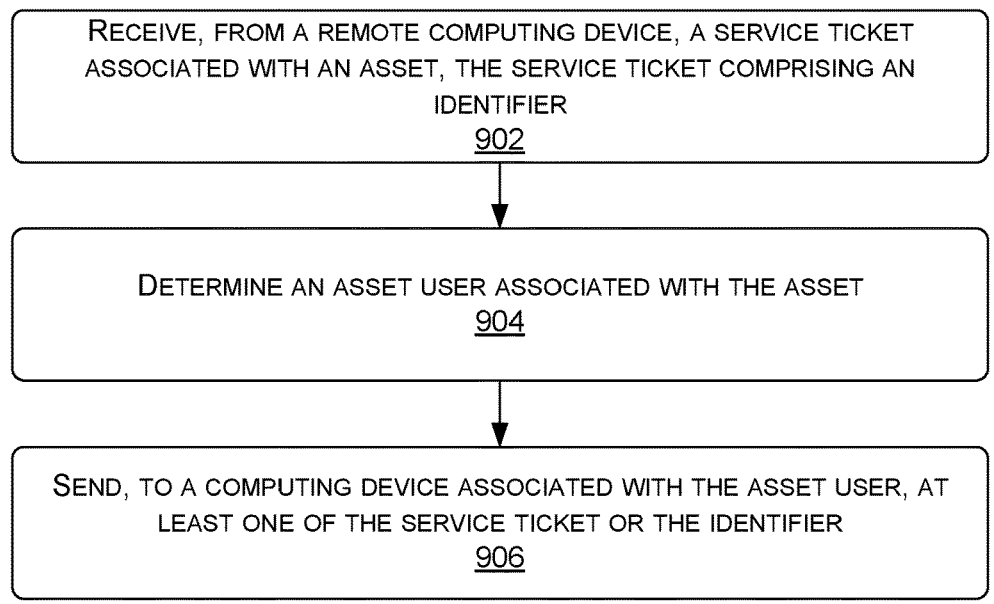
FIG. 9 illustrates an example process for sending a service ticket to a user computing device associated with the asset, as described herein.

FIGS. 8 and 9 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 8 illustrates an example process 800 for automatically generating a service ticket, as described herein. In various implementations, the process 800 is described with reference to the system 100 and may be performed by the ITAM computing device(s) 102 and/or in cooperation with any one or more of the computing devices 108. Of course, the process 800 may be performed in other similar and/or different environments.

At 802, an ITAM computing device may receive, from a first computing device, risk data associated with an asset. Risk data may include an asset identifier, an asset user (e.g., individual responsible for the asset), a type of asset (e.g., hardware, software, etc.), a reason associated with a compliance risk (e.g., out of compliance or at risk of being out of compliance), a deadline associated with compliance, and the like. In some examples, the application may be configured to generate a service ticket to document the compliance risk and provide a means by which the compliance risk may be mitigated.

In some examples, the ITAM computing device may receive the risk data via a tabular file, such as a .csv file or a .xls file. In such examples, the ITAM computing device may be configured to parse the tabular file to determine the risk data. In some examples, the ITAM computing device may receive the risk data via email. In some examples, the email may include risk data in a text of the email. In some examples, the email may include a hyperlink to a location associated with the risk data. In such examples, the ITAM computing device may be configured to access the hyperlink to determine the risk data. In some examples, the email may include the risk data in an attached file. In such examples, the ITAM computing device may parse the attached file to determine the risk data.

At 804, the ITAM computing device may receive an input associated with access to a second computing device associated with a service ticket generation component. The second computing device may include a remote computing device, such as that associated with a service provider configured to generate and manage service tickets.

In some examples, the ITAM computing device may receive the input via an instance of an application. In various examples, the ITAM computing device may receive the input via one or more input controls, such as those associated with a user interface, such as UI 300 and/or UI 500. In such examples, the input may include an alias and a password associated with the second computing device and/or the service ticket generation component associated therewith. In some examples, the input may include an instruction to log into the second computing device and/or the service ticket generation component associated therewith.

In some examples, the input may include an instruction to automatically generate a service ticket associated with the asset based at least in part on the risk data. In some examples, the instruction may include an indication that the user selected an automation selectable option, such as automation selectable option 318 or automation selectable option 522. In various examples, responsive to receiving the instruction to automatically generate the service ticket, the ITAM computing device may access or otherwise log into the second computing device in order to enter risk data and generate a service ticket.

AT 806, the ITAM computing device may generate, by an instance of an application, a command to generate a service ticket associated with the asset. The application may include an ITAM application, such as ITAM application 112. In various examples, the ITAM computing device may log into a service ticket generation system or component of the second computing device responsive to receiving the input. In some examples, the ITAM computing device may store login information associated with a user (e.g., ITAM system manager). In such examples, responsive to receiving an instruction (e.g., input) to log into the second computing device, the ITAM computing device may retrieve the stored login information (e.g., alias and password) for accessing the second computing device.

At 808, the ITAM computing device may send the command to the second computing device. In some examples, the ITAM computing device may determine the remote service provider associated with the service ticket and/or the asset associated therewith to determine the at least the portion of the risk data to send to the second computing device. For example, a first remote service provider may require a first set of risk data and a second remote service provider may require a second set of risk data in order to generate a service ticket. Based on a determination that the ITAM computing device is sending risk data to the second (remote service) computing device, the ITAM computing device may send the second set of risk data.

In various examples, the ITAM computing device may send risk data relevant to the service ticket, such as that based on data entry tables associated with service ticket generation. For example, the second computing device may include data entry tables associated with an asset type, asset user, description of the compliance risk (e.g., why the asset is at risk or out of compliance), data associated with compliance risk (e.g., deadline for compliance), the policy and/or regulation associated with the compliance risk. The ITAM computing device may send the data and cause the data entry tables to be filled with the associated risk data. In various examples, the ITAM computing device may include an API configured to cause the risk data to be entered into the data entry tables of the second computing device.

At 810, the ITAM computing device may receive a first service ticket from the second computing device, the first service ticket including an identifier (e.g., unique identifier associated with the first service ticket). The identifier may include a group of letters, numbers, and/or symbols used to identify the particular service ticket. In some examples, the ITAM computing device may receive the service ticket itself. In such examples, the ITAM computing device may be configured to store the service ticket on a datastore and/or send the service ticket to a computing device associated with a user (e.g., asset user, owner, or individual responsible for the asset) associated with the asset.

At 812, the ITAM computing device may cause at least the identifier to be presented on a display associated with the application. The display may include a display associated with the ITAM computing device and/or a display of the computing device associated with the user. In some examples, the ITAM computing device may surface the identifier in a service ticket window, such as service ticket window 322 or a risk response service ticket completed window, such as risk response service ticket completed window 532.

FIG. 9 illustrates an example process 900 for sending a service ticket to a user computing device associated with the asset, as described herein. In various implementations, the process 800 is described with reference to the system 100 and may be performed by the ITAM computing device(s) 102 and/or in cooperation with any one or more of the computing devices 108. Of course, the process 800 may be performed in other similar and/or different environments.

At 902, the ITAM computing device may receive, from a remote computing device, a service ticket associated with an asset, the service ticket comprising an identifier. The remote computing device may include a computing device associated with a remote service provider configured to generate and/or manage service tickets (e.g., including a service ticket generation component). The identifier may include a group of letters, numbers, and/or symbols used to identify the particular service ticket. In some examples, the ITAM computing device may receive the service ticket itself. In such examples, the ITAM computing device may be configured to store the service ticket on a datastore and/or send the service ticket to a computing device associated with a user (e.g., asset user, owner, or individual responsible for the asset) associated with the asset.

At 904, the ITAM computing device may determine an asset user associated with the asset. In some examples, the ITAM computing device may parse risk data associated with the asset to determine the asset user. In some examples, the ITAM computing device may determine an asset user identifier. The asset user identifier may include numbers, letters, and/or symbols in an order used to identify a particular individual that is responsible for an asset. In some examples, the ITAM computing device may determine the computing device associated with the asset user based on the asset user identifier.

AT 906, the ITAM computing device may send, to a computing device associated with the asset user, at least one of the service ticket or the service ticket identifier. In some examples, the ITAM computing device may store an instance of the service ticket on a datastore thereof. In examples in which the ITAM computing device sends the service ticket identifier, the ITAM computing device may enable the asset user to access an instance of the service ticket, such as via the remote computing device.

Technological Improvements

This disclosure is directed to an automated service ticket generation system. The automated service ticket generation system may include an information technology asset management (ITAM) application configured to receive risk data associated with one or more assets and automatically generate a service ticket for mitigating risk associated with IT compliance. In some examples, the service ticket includes an indication that the asset is at risk (e.g., within a threshold time) of being out of compliance with a policy and/or regulation. In such examples, the service ticket includes a notification to the asset user that, absent an action taken, the asset will be out of compliance with the policy and/or the regulation at a time in the future. In some examples, the service ticket includes an indication that the asset is out of compliance with the and/or the regulation. In such examples, the service ticket includes a risk response with a record of non-compliance. In some examples, the service ticket may include a mitigation task to be performed to ensure that the asset remains in compliance (for assets that are at risk of being out of compliance) or to bring the asset back into compliance (e.g., for assets that are out of compliance).

Implementations of the techniques and systems described herein can improve existing technologies (e.g., service ticket generation technologies), and can improve the functioning of the systems with respect to conventional systems. In particular, the implementations described herein allow an application associated with information technology asset management to automate a service ticket generation process that was previously performed manually. As described above, traditional ITAM systems included a manual generation of service tickets to either ensure that assets remained in compliance with policies and/or regulations or bring assets that were out of compliance back into compliance. In such traditional systems, an ITAM system manager may access a remote computing system and manually input risk data associated with an asset, to generate a service ticket associated therewith. The manual generation of a service ticket for each asset that is out of compliance or at risk of being out of compliance is time consuming and labor intensive for the ITAM system manager. The automated service ticket generation system described herein automates the traditionally manual process. At least the automation of the service ticket generation improves the existing technologies associated with service ticket generation.

Additionally, the automated service ticket generation system described herein improves the functioning of an associated computing device. In the traditional systems described above, the manual process to generate a service ticket involved about 5-7 minutes of time processing data, inputting data, generating the service ticket, etc. In contrast, the ITAM application described herein can generate the service ticket in a fraction of time. For example, one study estimated a time savings of over 250 man-hours in a first three-month period and over 300 man-hours in a second three-month period. The reduction in time required to generate the service tickets renders additional computing resources available for other functions of the computing device (e.g., increased processing power, etc.). Additionally, the reduction in time associated with each service ticket directly results in a decreased amount of connectivity time and network communications between the ITAM application (e.g., computing device associated therewith) and the remote computing device via which the service ticket is generated. The reduction in network communications may result in a reduction in amount of network bandwidth required to generate service tickets. Accordingly, the techniques described herein increase an amount of network bandwidth available for other network traffic.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program components can be located in both local and remote memory storage devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a display;
one or more processors; and
computer-readable media storing computer-executable instructions that, when executed by the one or more processors, cause the one or more processors to perform operations comprising:
receiving, from a first computing device via an electronic mail message and via an information technology asset management (ITAM) application, risk data identifying an asset that
will be out of compliance with a policy or a regulation within a period of time;
receiving an input associated with access to a second computing device;
generating, by the ITAM application and based at least in part on the input, a command to generate a service ticket associated with the asset, the command including at least a portion of the risk data;
sending the command to the second computing device;
receiving a first service ticket from the second computing device, the first service ticket being associated with the asset, and the first service ticket including a unique identifier; and
causing, by the ITAM application, at least the unique identifier to be presented on the display.

2. The system of claim 1, the operations further comprising:
determining, based at least in part on the risk data, a user associated with the asset; and
sending at least one of the unique identifier or the service ticket to a third computing device associated with the user.

3. The system of claim 1, the operations further comprising:
determining, based at least in part on the risk data, a user associated with the asset;
determining, based at least in part on the first service ticket, a mitigation task that will bring the asset into compliance with the policy or the regulation; and
causing a display associated with a third computing device associated with the user to identify the mitigation task.

4. The system of claim 3, the operations further comprising:
receiving, from the third computing device, an indication that the mitigation task has been completed; and
sending the indication to the second computing device.

5. The system of claim 1, wherein the risk data comprises first risk data associated with the asset, and the asset will be out of compliance with the policy or the regulation at a first time, the operations further comprising:
receiving, from the first computing device at a second time, second risk data associated with the asset, wherein the second risk data comprises an indication that the asset is out of compliance with the policy or the regulation;
receiving a second input associated with access to a third computing device associated with generating service tickets for non-compliant assets;
generating, by the ITAM application and based at least in part on the second input, a second command to generate a second service ticket associated with the asset, the second command including at least a portion of the second risk data;
sending the second command to the third computing device; and
receiving the second service ticket from the third computing device, the second service ticket comprising a record of non-compliance with the policy or the regulation.

6. The system of claim 1, the operations further comprising:
determining that the asset comprises a hardware asset; and
determining the risk data based at least in part on a document attached to the electronic mail message.

7. The system of claim 1, the operations further comprising:
determining that the asset comprises a software asset;
accessing a hyperlink in a text of the electronic mail message; and
determining the risk data based at least in part on the hyperlink.

8. The system of claim 1, wherein the at least the portion of the risk data comprises at least one of:
an identifier associated with a user;
a type of asset associated with the asset; or
the policy or the regulation associated with the risk data.

9. A method, comprising:
receiving, from a first computing device via an electronic mail message and via a network, risk data identifying an asset that is at risk of being out of compliance with a policy or a regulation within a period of time;
receiving an input associated with access to a second computing device;
generating, by an information technology asset management (ITAM) application and based at least in part on the input, a command to generate a service ticket associated with the asset, the command including at least a portion of the risk data;
sending the command to the second computing device;
receiving a first service ticket, from the second computing device via the network, the first service ticket being associated with the asset, and the service ticket including a unique identifier; and
causing, by the ITAM application, at least the unique identifier to be presented on a display associated with the ITAM application.

10. The method of claim 9, further comprising:
determining a threshold time associated with compliance with the policy or the regulation;
determining a date corresponding to the asset being out of compliance;
determining that a current date is within the threshold time of the date corresponding to the asset being out of compliance; and
determining that the asset is at risk of being out of compliance with the policy or the regulation within the period of time based at least in part on the current date being within the threshold time of the date corresponding to the asset being out of compliance.

11. The method of claim 9, wherein the risk data comprises first risk data associated with the asset that is at risk of being out of compliance at a first time, the method further comprising:
receiving, from the first computing device at a second time, second risk data associated with the asset, wherein the second risk data comprises an indication that the asset is out of compliance with the policy or the regulation;
receiving a second input associated with access to a third computing device associated with generating service tickets for non-compliant assets;
generating, by the ITAM application and based at least in part on the second input, a second command to generate a second service ticket associated with the asset, the second command including at least a portion of the second risk data;
sending the second command to the third computing device; and
receiving the second service ticket from the third computing device, the second service ticket comprising a record of non-compliance with the policy or the regulation.

12. The method of claim 11, further comprising:
determining an asset type associated with the asset; and
performing at least one of:
based on a determination that the asset type comprises a software asset, determining the second risk data based at least in part on a hyperlink in a text of the electronic mail message; or
based on a determination that the asset type comprises a hardware asset, determining the second risk data based at least in part on a document attached to the electronic mail message.

13. The method of claim 9, further comprising:
determining, based at least in part on the risk data, a user associated with the asset;
determining, based at least in part on the service ticket, a mitigation task that will bring the asset into compliance with the policy or the regulation within the period of time; and
causing a display associated with a third computing device associated with the user to identify the mitigation task.

14. The method of claim 13, further comprising:
determining a deadline for the mitigation task to be complete, the deadline being associated with the asset being at risk of being out of compliance of the policy or the regulation within the period of time; and
causing the deadline to be presented on the display associated with the third computing device.

15. A method, comprising:
receiving, from a first computing device via an electronic mail message and via a network, risk data associated with an asset that is out of compliance with a policy or a regulation, the asset comprising a hardware asset or a software asset;
receiving an input associated with access to a second computing device;
generating, by an information technology asset management (ITAM) application and based at least in part on the input, a command to generate a service ticket associated with the asset, the command including at least a portion of the risk data including whether the asset comprises the hardware asset or the software asset;
sending the command to the second computing device;
receiving a first service ticket from the second computing device via the network, the first service ticket being associated with the asset, and the service ticket including a unique identifier; and
causing, by the ITAM application, at least the unique identifier to be presented on a display associated with the ITAM application.

16. The method of claim 15, further comprising:
determining that the asset comprises the hardware asset; and
determining the risk data based at least in part on a document attached to the electronic mail message.

17. The method of claim 15, further comprising:
determining that the asset comprises the software asset;
accessing a hyperlink in a text of the electronic mail message; and
determining the risk data based at least in part on the hyperlink.

18. The method of claim 15, further comprising:
determining, based at least in part on the risk data, a user associated with the asset;
determining, based at least in part on the service ticket, a mitigation task that will bring the asset into compliance with the policy or the regulation; and
causing a display associated with a third computing device associated with the user to identify the mitigation task.

19. The method of claim 18, further comprising:
receiving, from the third computing device, an indication that the mitigation task is complete; and
sending, to the second computing device, the indication that the mitigation task is complete.

20. The method of claim 15, wherein the risk data further comprises one or more of an asset identifier, an asset user identifier associated with a user, or a deadline associated with compliance.

* * * * *